July 8, 1941. I. A. TEDDER 2,248,208
FRUIT BRANDING MACHINE
Original Filed Nov. 21, 1938
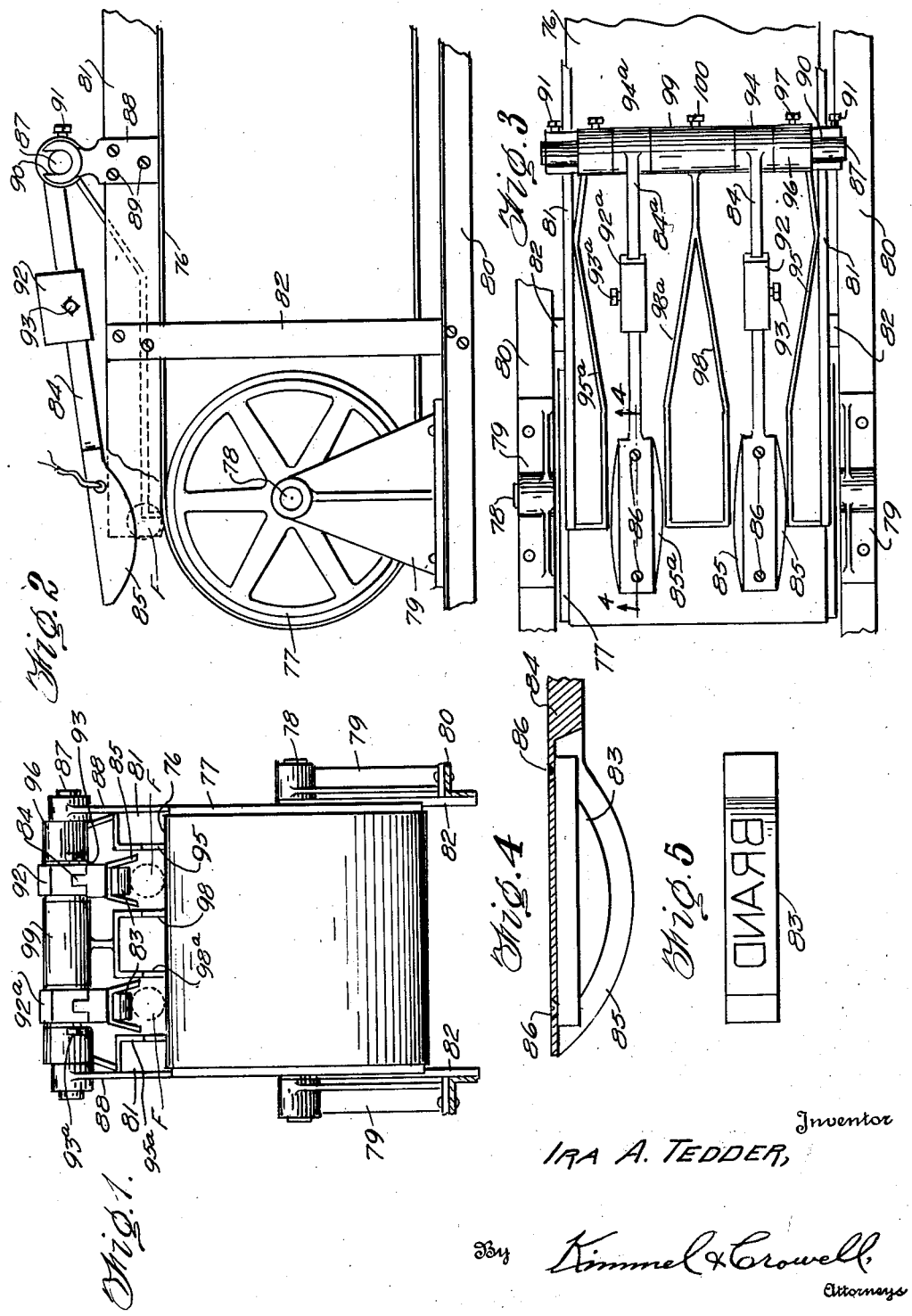
Inventor
IRA A. TEDDER,
By Kimmel & Crowell,
Attorneys Patented July 8, 1941

2,248,208

UNITED STATES PATENT OFFICE 2,248,208

FRUIT BRANDING MACHINE

Ira A. Tedder, San Benito, Tex., assignor, by direct and mesne assignments, to Tedder Fruit Branding Machine Company, a corporation Continuation of application Serial No. 241,679, November 21, 1938. This application June 29, 1940, Serial No. 343,282

9 Claims. (Cl. 101—8)

This application is a continuation of my copending application, Serial Number 241,679, filed November 21, 1938, for "Fruit branding machine."

This invention relates to branding or marking devices and more particularly to a device adapted for use in branding or marking fruits, such as citrus fruits or the like.

An object of this invention is to provide a means whereby an identifying mark in the form of a brand or design may be formed on the outside of the fruit in such a manner that the mark or brand cannot be removed from the skin of the fruit without injuring the skin of the fruit.

Another object of this invention is to provide a branding or marking device of this kind which is so constructed that it can be used with conveyors at present used in the sizing of the fruit without embodying any undue changes and at a relatively small cost.

A further object of this invention is to provide a branding or marking device of this kind which is operated by electricity and which is adapted to burn the skin of the fruit to the desired depth so that the fruit itself will not be injured, but at the same time, the brand or mark cannot be removed without damaging the fruit so that it will not be an easy matter to remove the brand and substitute another brand or marking therefor.

At the present time, it is the practice to impress brands or marks on the skin of the fruit by inking devices, but such brands or marks can be easily removed or changed so that the purchaser of the fruit will purchase fruit of a quality which is not identified by the particular brand, and in this manner, it is an easy matter to change the brand or mark without injuring the skin of the fruit so that the consumer or purchaser will not be able to readily determine whether a particular article of fruit has had the brand or mark thereon changed. The use of a branding device of this kind will burn the brand into the skin of the fruit to such a degree that it will not be possible to remove the brand without undue labor and expense and also without injuring the skin of the fruit.

A further object of this invention is to provide a device of this kind which may be used for different sizes of fruit without requiring any change whatever in the construction of the device as if desired, several different sizes of fruit may be run through the device and each size of fruit will be properly branded or marked.

A further object of this invention is to provide a device of this kind which may be installed at a relatively small cost and which may be maintained at a relatively low cost, the device including means whereby the device will not injure either the fruit or the persons operating the device.

To the above objects and to others which may hereinafter appear, the invention consists of the novel construction, combination and arrangement of parts as will be more specifically referred to and illustrated by the accompanying drawing wherein is shown an embodiment of the invention, but it is to be understood that changes, variations and modifications may be resorted to which fall within the scope of the invention as claimed.

In the drawing:

Figure 1 is a detail front elevation of a branding or marking device constructed according to an embodiment of this invention, Figure 2 is a detailed side elevation of the device;

Figure 3 is a fragmentary top plan of the device;

Figure 4 is an enlarged fragmentary sectional view taken on the line 4—4 of Figure 3, and Figure 5 is a detailed bottom plan of the branding device used with the structure shown in Figures 1 to 4, inclusive.

Referring now to the drawing, the numeral 76 designates the upper run of a conveyor which is trained over a drum 77 carried by a shaft 78. The shaft 78 is journalled in bearings 79 carried by a frame 80. A pair of upwardly extending side wall members 81 are secured to supporting bars 82 and extend on opposite sides of the conveyor member 76.

An arcuate branding member 83 is secured to the free end of a rock lever 84 being disposed within a pair of downwardly divergent flanges or channel members 85. The branding member 83 is secured to the lever 84 by means of screws 86 or the like and this branding member 83 is provided on the convex surface thereof with characters, designs or the like 42a similar to the characters 42 on the branding member 33. The branding member 83 is adapted to be connected to a source of current supply by conductors 52a. The lever 84 is rockably mounted on a transversely extending shaft 87 which is supported by means of a pair of brackets 88 secured as by bolts or screws 89 to the side walls 81. The brackets 88 are provided with upwardly opening slots 90 and the shaft 87 is secured in the slots 89 by set screws 91.

The lever 84 is provided intermediate the ends thereof with a weight member 92 which is slidable along the length of the lever 84 and secured in adjusted position by means of a set screw 93 so that the desired pressure may be applied to the free end or outer end of the lever 84. The lever 84 is provided at its inner end with a hub 94 loosely engaging the shaft 87, and in the present instance, there are provided two levers 84 and 84a which are mounted on the shaft 87 in spaced apart relation. A fruit guiding rod 95 is secured at one end to a sleeve 96 fixed as by a set screw 97 to the shaft 87. The guiding rod 95 coacts with a second guiding rod 98 carried by a sleeve 99 fixed to the shaft 87 in order to guide the fruit moving along the conveyor member 76 to the channel member 85. The sleeve 99 is fixed to the shaft 87 by means of a set screw 100 and is positioned between the sleeve 94 and the sleeve 94a carried by the levers 84 and 84a. A second guide rod 95a is positioned on the side opposite from the guide member 95 and coacts with a guide member 98a in guiding the fruit to the second channel 85a carried by the second lever 84a. The second weight 92a is secured to the lever 84a and is adjusted along the length of the lever 84a by means of a set screw 93a.

In the use and operation of this device, the levers 84 and 84a are swingable on the shaft 87 and contact with the fruit F as the fruit rolls between the guiding members 95 and 96. This branding device may be combined with the present structure used for sizing or sorting the fruit being positioned on the side walls of the conveyor structure, and when it is not desired to brand the fruit, the branding device may be readily removed from the conveyor by releasing the set screws 91 and lifting the shaft 87 from the brackets 88. Removal of the shaft 87 will lift both levers 84 and 84a and also the guiding member 95, 95a, 98 and 98a from the space between the side wall members 81. The branding members 83 are adapted to be connected to a suitable voltage reducing transformer structure of conventional construction.

What I claim is:

1. In a fruit conveyor including an endless conveyor belt and stationary upstanding walls on opposite sides of the belt; a fruit marking attachment comprising a rock lever, means engaging said walls and the lever rockably supporting the lever above the belt, a heated marking means fixedly carried by said lever, and means carried by said supporting means guiding the fruit toward said marking means.

2. In a fruit conveyor including an endless conveyor belt and stationary upstanding walls on opposite sides of the belt; a fruit marking attachment comprising a rock lever, a pair of bearing members, means securing said bearing members to said walls, a shaft engaging said bearing members and said lever, a heated marking means carried by said lever, and fruit guide means carried by said shaft.

3. In a fruit conveyor including an endless conveyor belt and stationary upstanding walls on opposite sides of the belt; a fruit marking attachment comprising a rock lever, a pair of bearing members, means securing said members to said walls, said members each having an upwardly opening slot therein, a lever supporting shaft removably engaging in said slots, means securing said shaft in the slots of said bearing members, fruit guide means carried by said shaft on opposite sides of said lever, and marking means carried by said lever.

4. In a fruit conveyor including an endless conveyor belt and stationary upstanding walls on opposite sides of the belt; a fruit marking attachment comprising a rock lever, a pair of bearing members, means securing said members to said walls, said members each having an upwardly opening slot therein, a lever supporting shaft removably engaging in said slots, means securing said shaft in the slots of said bearing members, fruit guide means carried by said shaft on opposite sides of said lever, and a convex heated marking means carried by said lever in a position confronting said belt.

5. A fruit marking attachment for a conveyor having upstanding side walls comprising a shaft extending transversely across the conveyor, shaft supporting means fixed to said side walls, said supporting means including a boss having an upwardly opening shaft receiving recess therein, means removably holding said shaft in said recess, a rock lever loose on said shaft, a heated marking device fixedly carried by said lever, fruit guide means carried by said lever on opposite sides of said marking device, and a second fruit guide means fixed to said shaft and extending in the direction of the free end of said lever, said shaft, lever and second guide means being removable as a unit from said supporting means.

6. A fruit marking attachment for a conveyor having upstanding side walls comprising a shaft extending transversely across the conveyor, means detachably supporting said shaft from said side walls, a rock lever loose on said shaft, a marking device fixedly carried by said lever, and fruit guide means fixed to said shaft and extending in the direction of the free end of said lever whereby to guide the fruit towards said marking device, said shaft, lever and guide means being removable as a unit from said conveyor side walls.

7. A fruit marking attachment for a conveyor having upstanding side walls comprising a shaft extending transversely across the conveyor, upstanding supporting means detachably fixed to the side walls of the conveyor, a shaft supporting boss carried by each supporting means, means removably securing said shaft in said bosses, a rock lever loose on said shaft, a marking device fixedly carried by said lever, a pair of fruit guiding members disposed on opposite sides of said lever, means fixedly securing said guide means to said shaft, said guide means, lever and shaft being removable as a unit from said supporting means.

8. A fruit marking attachment for a conveyor having upstanding side walls comprising a shaft extending transversely across the conveyor, shaft supporting means fixed to said side walls, said supporting means including a boss having a shaft receiving recess therein, means removably holding said shaft in said recess, a rock lever loose on said shaft, a marking device fixedly carried by said lever, fruit guide means carried by said lever on opposite sides of said marking device, and a second fruit guide means fixed to said shaft and extending in the direction of the free end of said lever, said shaft, lever and second guide means being removable as a unit from said supporting means.

9. In a fruit conveyor including an endless conveyor belt and stationary upstanding walls on opposite sides of the belt; a fruit marking attachment comprising a rock lever, a pair of bearing members, means securing said members to said walls, said members each having a slot therein, a lever supporting shaft removably engaging in said slots, means securing said shaft in the slots of said bearing members, fruit guide means carried by said shaft on opposite sides of said lever, and a marking means carried by said lever in a position confronting said belt.

IRA A. TEDDER.